(12) United States Patent
Yuan

(10) Patent No.: US 12,515,274 B2
(45) Date of Patent: Jan. 6, 2026

(54) LOW-VOLTAGE HIGH-CURRENT LIGHT-WEIGHT SPOT WELDING MACHINE

(71) Applicant: HEFEI SANYU ELECTRIC CO., LTD., Anhui (CN)

(72) Inventor: Zhongjie Yuan, Anhui (CN)

(73) Assignee: HEFEI SANYU ELECTRIC CO., LTD., Anhui (CN)

( * ) Notice: Subject to any disclaimer, the term of this patent is extended or adjusted under 35 U.S.C. 154(b) by 180 days.

(21) Appl. No.: 18/260,675

(22) PCT Filed: Dec. 17, 2021

(86) PCT No.: PCT/CN2021/139154
§ 371 (c)(1),
(2) Date: Jul. 7, 2023

(87) PCT Pub. No.: WO2022/148228
PCT Pub. Date: Jul. 14, 2022

(65) Prior Publication Data
US 2024/0051061 A1     Feb. 15, 2024

(30) Foreign Application Priority Data

Jan. 8, 2021 (CN) .......................... 202110021360.X

(51) Int. Cl.
*B23K 11/11*     (2006.01)
*B23K 11/31*     (2006.01)
(Continued)

(52) U.S. Cl.
CPC ........... *B23K 11/115* (2013.01); *B23K 11/314* (2013.01)

(58) Field of Classification Search
CPC .......... H01F 27/32; H01F 27/02; H01F 27/10; H01F 27/24; H02M 7/003; B23K 11/115; B23K 11/314
(Continued)

(56) References Cited

U.S. PATENT DOCUMENTS 1,343,205 A * 6/1920 Eschholz ............. B23K 9/1031
                                                                      315/308
2,719,946 A * 10/1955 Riley ...................... H01F 27/40
                                                                       336/55
(Continued)

FOREIGN PATENT DOCUMENTS

CN     106216828 A     12/2016
CN     207508506 U     6/2018
(Continued)

OTHER PUBLICATIONS

DE 202011052206 U1—English Translation (Year: 2012).*

*Primary Examiner* — Anatoly Vortman
(74) *Attorney, Agent, or Firm* — Hawaii Patent Services; Nathaniel K Fedde; Kenton N. Fedde

(57) ABSTRACT

A low-voltage high-current light-weight spot welding machine includes a welding power supply device, wherein the welding power supply device includes a casing, a first electrode and a second electrode; a movable arm assembly, including a movable arm and at least one nut flange, wherein an end of the movable arm is connected with the at least one nut flange; at least one connection block, provided in between the first conductivity block and the first electrode; a drive assembly, wherein a drive rod of the drive assembly is connected with the at least one nut flange, the drive rod is located on the casing; a static arm, wherein the static arm is connected with the second electrode via a second conduc- (Continued)

tivity bridge, and the lateral connection plates are rotatably connected at the at least one flange structure.

10 Claims, 8 Drawing Sheets

(51) Int. Cl.
  *H01F 27/02* (2006.01)
  *H01F 27/24* (2006.01)
(58) Field of Classification Search
  USPC .................................................. 361/601, 704
  See application file for complete search history.

(56) References Cited

U.S. PATENT DOCUMENTS

| | | | | | |
|---|---|---|---|---|---|
| 2,800,571 | A | * | 7/1957 | Glenn | B23K 9/0735 |
| | | | | | 315/141 |
| 3,264,446 | A | * | 8/1966 | Gronlund | B23K 37/0223 |
| | | | | | 219/81 |
| 4,694,140 | A | * | 9/1987 | Wheeler | H01F 27/10 |
| | | | | | 336/60 |
| 5,160,820 | A | * | 11/1992 | Tsujii | H01F 38/085 |
| | | | | | 29/605 |
| 10,717,148 | B2 | * | 7/2020 | Nicewonger | H05K 7/20272 |
| 2004/0208031 | A1 | * | 10/2004 | Miwa | H02K 7/06 |
| | | | | | 363/141 |
| 2006/0289395 | A1 | * | 12/2006 | Nomizu | G01R 31/58 |
| | | | | | 219/109 |
| 2007/0199556 | A1 | * | 8/2007 | Murai | B23K 11/315 |
| | | | | | 126/20 |
| 2013/0008877 | A1 | * | 1/2013 | Han | H01F 38/085 |
| | | | | | 219/116 |
| 2016/0129520 | A1 | * | 5/2016 | Schwartz | H05K 7/20136 |
| | | | | | 219/130.1 |
| 2024/0051061 | A1 | * | 2/2024 | Yuan | B23K 11/311 |
| 2024/0387097 | A1 | * | 11/2024 | Chinzaka | H01F 27/324 |

FOREIGN PATENT DOCUMENTS

| | | |
|---|---|---|
| CN | 208496049 U | 2/2019 |
| CN | 209035691 U | 6/2019 |
| CN | 112756758 A | 5/2021 |
| DE | 202011052206 U1 | 1/2012 |
| EP | 1352700 A2 | 10/2003 |

* cited by examiner

LOW-VOLTAGE HIGH-CURRENT LIGHT-WEIGHT SPOT WELDING MACHINE

TECHNICAL FIELD

The present invention belongs to the technical field of welding machines, and specifically a low-voltage high-current light-weight spot welding machine.

BACKGROUND TECHNOLOGY

Currently, light-weight and small-sized electric resistance welding machines are popular among the public, however, the structural design of most electric resistance welding machines is complex, installation of the welding power supply devices is always done by using complicated frames, which are of big volume and heavy weight, and consequently, the target of light-weight cannot be realized, the reason lies in that the assembly of the welding tongs, the drive devices and the welding power supply is complex and interlinked, it is next to impossible to maintain and replace the modules separately, the target of small-sized design cannot be realized either. Therefore, users have to use electric resistance welding tongs of large volumes and buy expensive heavy-load robotic devices, consequently, unpredictable safety hazard may occur, and expenses are increased, in this sense, it is essential to design small-sized connection structures of the welding tongs.

SUMMARY OF THE INVENTION

To address the foregoing technical problems, the present invention proposes a low-voltage high-current light-weight spot welding machine, wherein a movable arm assembly is connected with a first electrode via a first conductivity bridge, a connection block is provided on the first electrode, a drive assembly is connected at an end of the movable arm assembly, the drive assembly is located as a bottom portion of a casing housing a welding power supply device, a static arm is connected with a second electrode, at least one lateral connection plate is provided at both sides of the static arm, via screws the movable arm assembly, the connection block, the drive assembly and the static arm are connected to be a bearing connection mechanism of a welding tong of a spot welding machine, and the bearing connection mechanism is installed tightly with the welding power supply device, in this way, the bearing connection mechanism of the welding tong and the welding power supply device are detachable to be two individual units and light weight and small size design of the spot welding machine can be realized.

The present invention proposes a low-voltage high-current light-weight spot welding machine, comprising:
- a welding power supply device, wherein the welding power supply device comprises a casing, a first electrode and a second electrode, wherein portions of the first electrode and the second electrode extend out of the casing, and the portions of the first electrode and the second electrode extending out of the casing are located at the same side of the casing;
- a movable arm assembly, comprising a movable arm and at least one nut flange, wherein an end of the movable arm is connected with the at least one nut flange, the movable arm assembly is connected with the first electrode via a first conductivity bridge;
- at least one connection block, provided in between the first conductivity block and the first electrode, and is connected with the first electrode;
- a drive assembly, wherein a drive rod of the drive assembly is connected with the at least one nut flange, the drive rod is configured to drive the movable arm and is located at a bottom portion of the casing, and at least one flange structure is provided on the drive rod;
- a static arm, wherein the static arm is connected with the second electrode via a second conductivity bridge, the static arm is connected with the movable arm via lateral connection plates, the lateral connection plate are connected with the static arm and the at least one connection block via a plurality of bolts, and the lateral connection plates are rotatably connected at the at least one flange structure;

wherein, by connecting the movable arm assembly, the at least one connection block, the drive assembly and the static arm with the lateral connection plates, a bearing connection mechanism of the welding tong of a spot welding machine is formed and the bearing connection mechanism is integrally connected with the welding power supply device.

Further, a plurality of connection holes are provided on the portions of the first electrode and the second electrode extending out of the casing, and the first electrode is vertically provided and the second electrode is horizontally provided.

Further, the lateral connection plates are provided in parallel at both sides of the movable arm and the static arm.

Further, slots are provided on the lateral connection plates.

Further, projections are provided on opposing sides of the at least one nut flange, and the projections are located in the slots.

Further, the lateral connection plates are configured to be similar to a right-angled triangle, and either ends of hypotenuses of the lateral connection plates are connected with the static arm and another ends thereof are connected with the at least one flange structure.

Further, the ends of the hypotenuses of the lateral connection plates connected with the at least one flange structure are configured to be semi-circular, and through-holes are provided in the semi-circular portions.

Further, the flange structure comprises a flange and rotation shafts connected at both sides of the flange, and semi-circular grooves are provided at both sides of the flange.

Further, the lateral connection plates are connected on the rotation shafts via the through-holes, and the ends of the hypotenuses configured to be semi-circular are installed in the semi-circular grooves.

Further, the at least one connection block is configured to be a U-shaped connection block, and the U-shaped connection block is connected with the first electrode.

In the present invention, by tight connection of the movable arm assembly, the drive assembly and the static arm with the lateral connection plates provided at both sides of the static arm, a bearing connection mechanism of the welding tong is formed; and by the connection position of the at least one connection block in the bearing connection mechanism of the welding tong, rapid connection of the welding power supply device is realized and modular assembly of the welding tong, the welding power supply device and the drive assembly is realized and the welding tong can be made in small sizes;

In the present invention, by structural design of the lateral connection plates and utilizing the stability principle of triangles, the static arm is connected with the at least one flange structure in the drive assembly and by rotatable design of the lateral connection plates and the flange structure, operation space is provided for working of the movable arm;

In the present invention, by configuration of the at least one connection block and the lateral connection blocks, and provision of the at least one connection block at an end of the static arm far away from the electrode in X-shaped welding tongs and C-shaped welding tongs, configuring the at least one connection block to be U-shaped, providing the U-shaped groove of the at least one connection block to be parallel to a longitudinal direction of the drive rod, and parallel configuration of the welding power supply device and the drive assembly, the entire welding tong structure is made tight and small size design can be realized. In the meanwhile, the X-shaped welding tongs and the C-shaped welding tongs can be connected with the same type of welding power, by configuration of the lateral connection plates and connecting the movable arm assembly, the at least one connection block, the drive assembly and the static arm together via screws, the welding power supply device can be fixed together, so that the bearing connection mechanism of the welding tongs and the welding power supply device can be detached to be two individual units, the welding tong structures can be designed to be of small size and detachable, two types of welding tongs can be changed quickly and great convenience is brought to the production and maintenance work.

BRIEF INTRODUCTION OF DRAWINGS

To explain the technical solutions in the present invention to a better extent, hereinafter a brief introduction will be given to drawings to be used in the description of embodiments of the present invention, apparently, the drawings described herein are only some of the embodiments of the present invention, for those of ordinary skill in the art, without paying creative effort, it is still possible to obtain other drawings based on these drawings.

Figure 1:
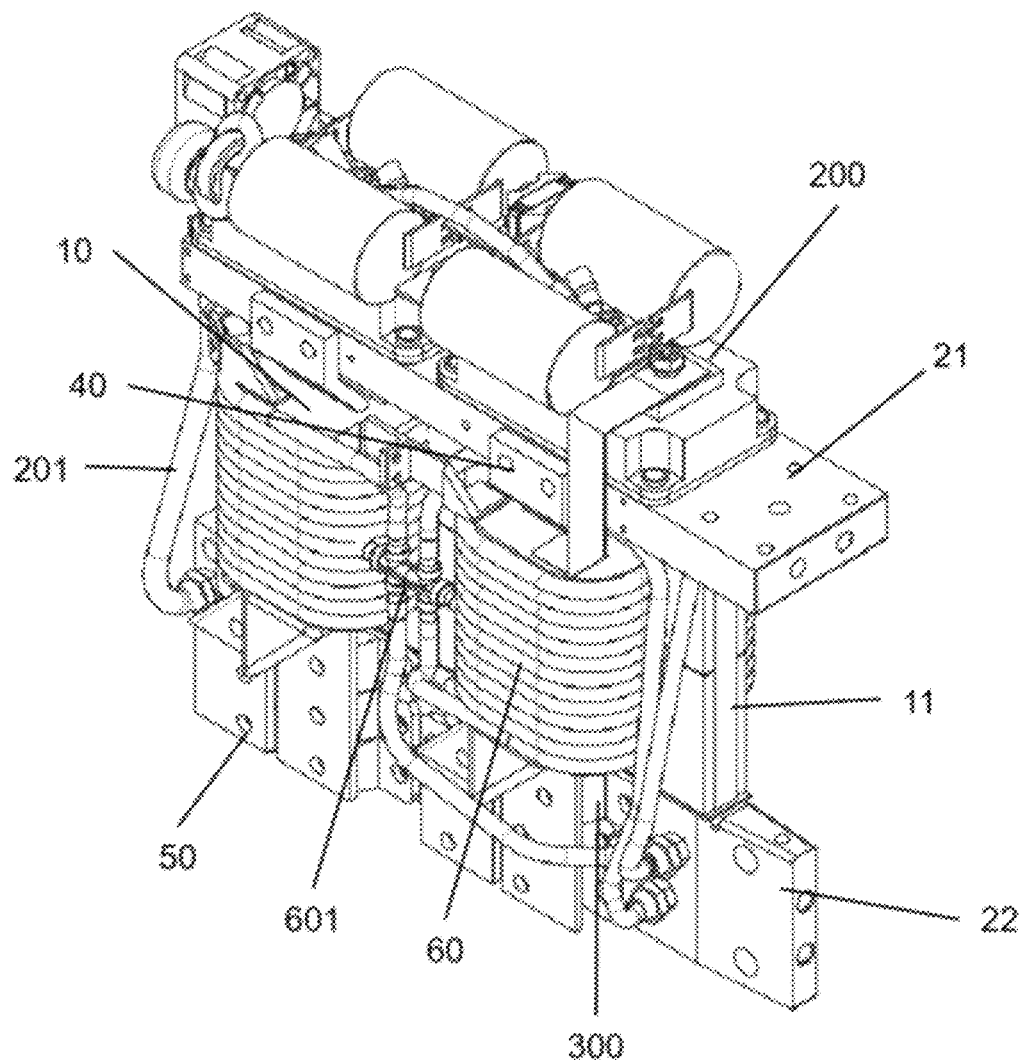
FIG. 1 is a structural diagram showing a low-voltage high-current welding power supply device proposed in the present invention.

In the drawings: 10 transformer body; 11 magnetic core; 40 central leading out terminal; 50 secondary leading out terminal; 21 first heat dissipation plate; 22 second heat dissipation plate; 200 inverter assembly; 300 rectifier assembly; 201 communication tube; 60 cooling water pipe; 601 water pipe joint; 111 casing; 102 air outlet; 112 second electrode; 113 bottom portion of the casing; 120 movable arm assembly; 121 movable arm; 211 transverse rod; 212 rotation plate; 122 nut flange; 123 movable arm electrode cap; 1201 first conductivity bridge; 130 connection block; 140 drive assembly; 141 drive rod; 142 flange structure; 421 flange; 422 rotation shaft; 510 lateral connection plate; 511 slot; 512 through-hole; 150 static arm; 501 second conductivity bridge; and 221 projection.

EMBODIMENTS

Hereinafter the embodiments of the present invention are explained by some specific embodiments, and those skilled in the art shall readily understand other advantages and effects of the present invention based on the contents disclosed in the present description. The present invention can also be realized in other different ways and the details disclosed in the present invention can be modified or changed without departing from the spirit of the present invention.

It shall be noted that, the drawings provided in the present invention are only intended to describe the basic idea of the present invention, and in the drawings only components related to the present invention are shown, and the components are not necessarily shown in exactly the same number, shape and dimension as being employed during actual implementation, actually, during implementation, random changes can be done to shapes, numbers and ratios of the components and configurations and shapes of the components can be more complicated.

Figure 4:
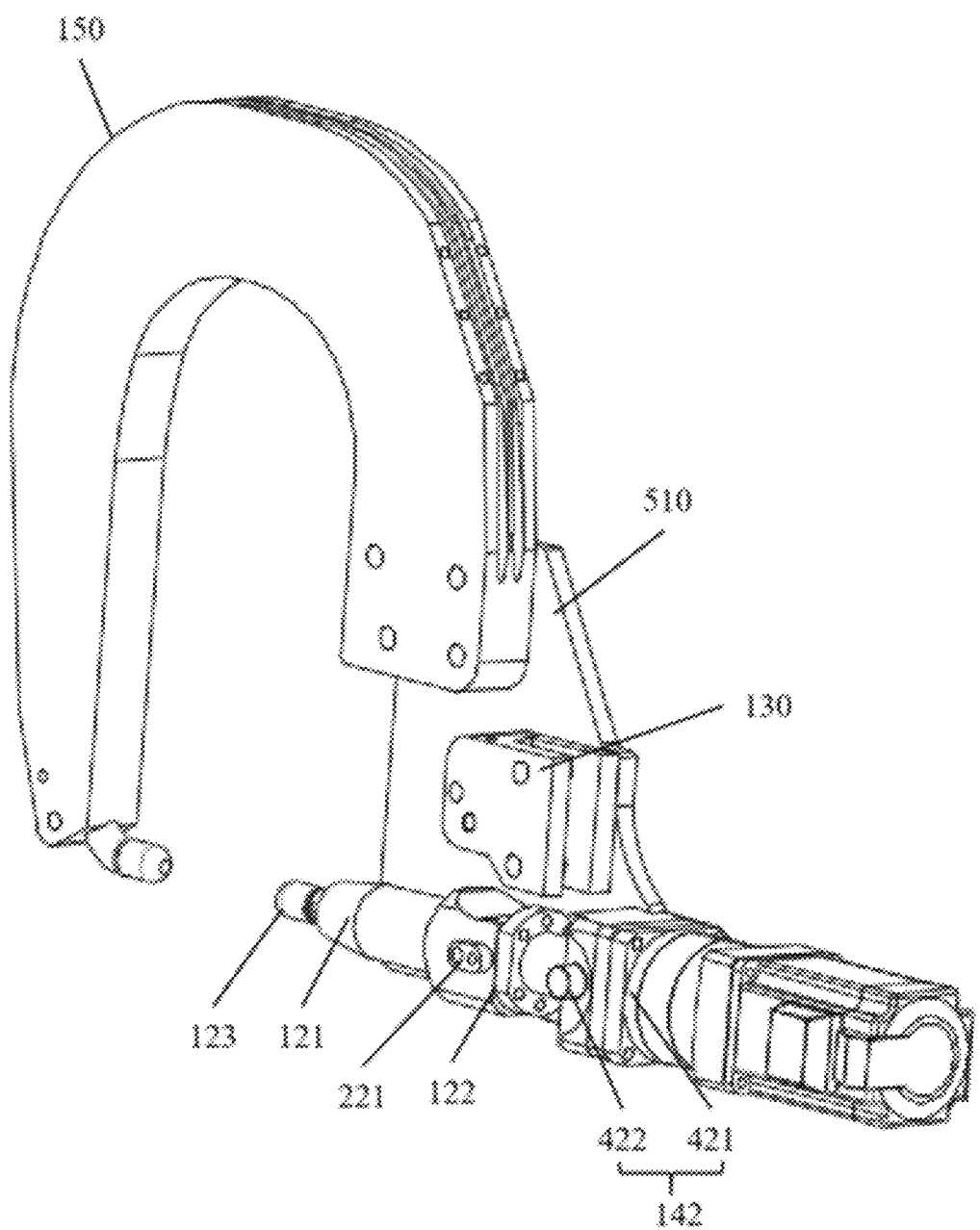
FIG. 4 is a structural diagram showing a C-shaped welding tong of the low-voltage high-current light-weight spot welding machine proposed in the present invention.

A low-voltage high-current light-weight spot welding machine is provided in the present invention, wherein a welding power supply device of the low-voltage high-current light-weight spot welding machine comprises a casing 111 and a first electrode and a second electrode 102 extending out of the casing, portions of the first electrode and the second electrode 112 extending out of the casing 111 are provided at the same side of the casing, and as shown in FIG. 4, a plurality of air outlets 102 are provided in the casing 111.

As shown in FIG. 1, in the present embodiment, a plurality of cooling water passages are provided in the first electrode and the second electrode 112, the plurality of cooling water passages act on the welding power supply device comprising a transformer, an inverter assembly 200 and a rectifier assembly 300. The first electrode serves as a second heat dissipation plate 22 of the transformer and the second electrode 112 serves as a first heat dissipation plate 21 of the transformer, and the first electrode is vertically provided and is close to a bottom portion of the casing 111 and the second electrode 112 is horizontally provided and close to the top portion of the casing 111.

As shown in FIG. 1, in the present embodiment, the transformer comprises a transformer body 10, wherein the transformer body 10 comprises a magnetic core 11, a primary coil and at least one secondary coil, the primary coil and the at least one secondary coil are configured to be copper ribbon structures and are respectively wound around the magnetic core 11 tightly and are located at an intermediate position of the magnetic core 11, and insulation thermal conduction paste is filled therein, in this way a transformer line pack is formed, thermal conduction in between the coils are enhanced and heat in the transformer line pack is transferred to a surface of the transformer line pack and heat dissipation effects can be improved.

As shown in FIG. 1, in the present embodiment, a plurality of central leading out terminals 40 and a plurality of secondary leading out terminals 50 of ribbon-shaped structures are provided at different positions of the at least one secondary coil, and the plurality of central leading out terminals 40 and the plurality of secondary leading out terminals 50 are symmetrically provided at both sides of the magnetic core; the transformer comprises a heat dissipation unit, cooling water passages are provided in the heat dissipation unit, the heat dissipation unit comprises a first heat dissipation plate 21 (the second electrode 112) and a second heat dissipation plate 22 (the first electrode), an insulation layer is provided in between the first heat dissipation plate 21 and the second heat dissipation plate 22 and the transformer body 10, and the first heat dissipation plate 21 and the second heat dissipation plate 22 are provided at opposing sides of the transformer body 10. The plurality of central leading out terminals 40 are symmetrically connected at both sides of the first heat dissipation plate 21, the plurality of secondary leading out terminals 50 are symmetrically connected at both sides of the second heat dissipation plate 22, a communication tube 201 is provided in between the first heat dissipation plate 21 and the second heat dissipation plate 22, an end of the communication tube 201 is connected with the cooling water passages provided in the first heat dissipation plate 21 and another end thereof is connected with the cooling water passages in the second heat dissipation plate 22.

As shown in FIG. 1, in the present embodiment, the transformer further comprises at least one cooling water pipe 60, the at least one cooling water pipe 60 is wound in between the primary coil and the at least one secondary coil, and insulation thermal conduction paste is filled therein to form an outer side of the transformer line pack, the at least one cooling water pipe 60 further comprises an intermediate cooling water pipe, an end of the intermediate cooling water pipe is connected with the water pipe joint 601, another end thereof is connected with the heat dissipation unit, and by connection of the at least one cooling water pipe 60 and the water pipe joint heat generated by the primary coil and the at least one secondary coil is disseminated and cooled down; the welding power supply device further comprises the inverter assembly 200 and the rectifier assembly 300, the first heat dissipation plate 21 is horizontally provided at a top portion of the transformer body 10, the second heat dissipation plate 22 is vertically provided at a bottom portion of the transformer body 10, and the inverter assembly 200 is provided closely on the first heat dissipation plate 21 and is located at a side opposite to the transformer body 10; the rectifier assembly 300 is symmetrically assembled on the second heat dissipation plate 22, the rectifier assembly 300 comprises a plurality of rectifiers, and the plurality of rectifiers are symmetrically provided at both sides of the second heat dissipation plate 22, and are located in between the plurality of secondary leading out terminals and the second heat dissipation plate 22. With the first heat dissipation plate 21 and the second heat dissipation plate 22 the inverter assembly 200, the rectifier assembly 300 and the transformer are tightly assembled to be a tight integral power supply device.

In the present invention, by winding the copper strips in different layers closely, providing the plurality of central leading out terminals and the plurality of secondary leading out terminals at both sides of the magnetic core, providing the heat dissipation unit at the top portion and the bottom portion of the transformer body, winding the cooling water pipes around the transformer line pack and by cooling of the inverter assembly and the rectifier assembly via the heat dissipation unit, the transformer can work for a long term at the current of tens of thousands of amperes, as the leakage inductance is small, active power is big, voltage stress is greatly reduced, components and parts of smaller volumes can be selected for the rectifiers and the inverters, so requirements on cooling are reduced, which makes the tight integral design of the power supply device possible. As the leakage inductance of the transformer is small, duty-ratio-loss is small, the low-voltage high-current power supply device can maintain high efficiency output at the working frequency of 20 KHz. The structural design of the power supply device is tight, configurations thereof are reasonable, space is fully used so that the volume of the welding power supply device is small and small-sized design of the welding power supply device is achieved.

Figure 2:
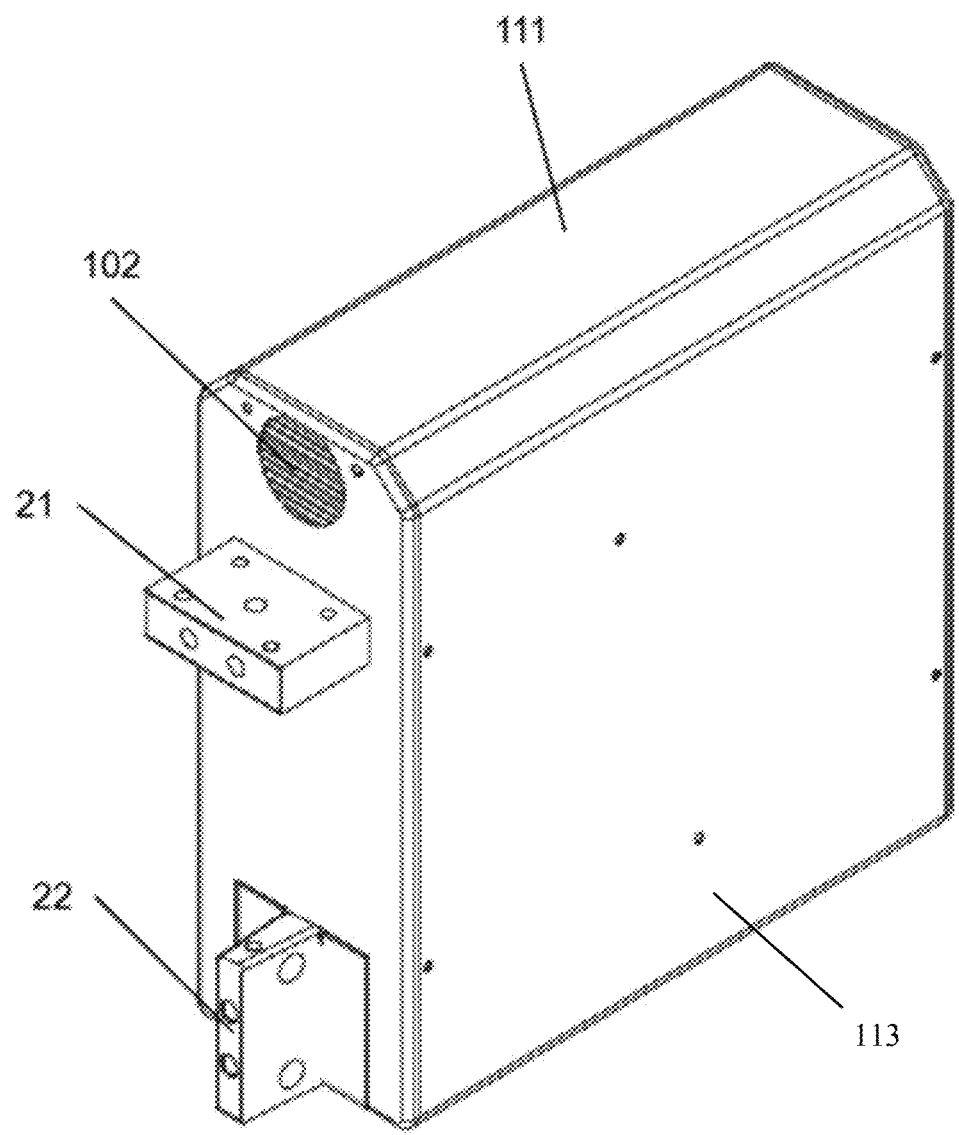
FIG. 2 is a structural diagram showing a casing of the low-voltage high-current power supply device proposed in the present invention.
Figure 3:
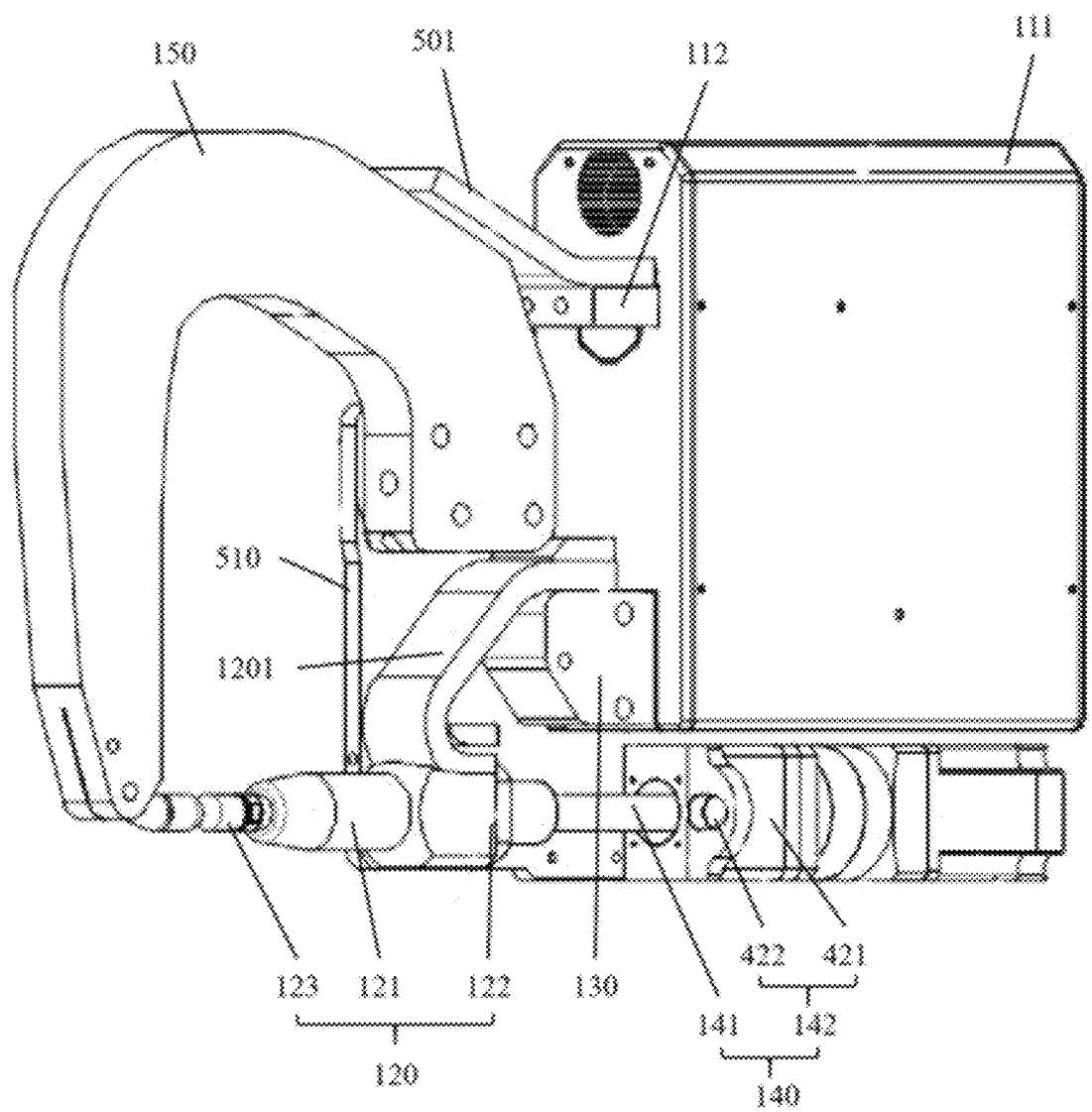
FIG. 3 is a structural diagram showing a low-voltage high-current light-weight spot welding machine proposed in the present invention.

As shown in FIGS. 2 and 3, in the present embodiment, the welding power supply device comprises the casing 111, the first electrode and the second electrode 112, portions of the first electrode and the second electrode 112 extend out of the casing 111, and the portions of the first electrode and the second electrode 112 extending out of the casing 111 are located at the same side of the casing 111, the first electrode is vertically provided and is close to the bottom portion of the casing 111, the second electrode 112 is horizontally provided and is close to a top portion of the casing 111, a plurality of connection holes are provided on the portions of the first electrode and the second electrode 112 extending out of the casing 111, the plurality of connection holes are configured to be connected with the movable arm assembly 120 and the static arm assembly 150 so that connection between the welding tong and the welding power supply device is simple and detachment is easy.

As shown in FIGS. 3 and 4, in the present embodiment, the at least one connection block 130 is configured to be a U-shaped connection block, a U-shaped groove of the U-shaped connection block is parallel to a longitudinal direction of the drive rod 141, the welding power supply device is parallel to the drive assembly, so that the entire welding tong is of tight structures and small-sized design is thus possible.

As shown in FIGS. 3 and 4, in the present embodiment, the drive assembly 140 comprises the drive rod 141 and at least one flange structure 142, the at least one flange structure 142 is provided on the drive rod 141, the drive rod 141 is connected with the nut flange 22, the drive assembly 140 is configured to drive the movable arm 121, the drive assembly 140 and the movable arm assembly 120 are connected to be an integral structure, and the drive assembly 140 is located at the bottom portion of the casing 111 and is connected with the welding power supply device via the at least one connection block 130, in this way, detachment and installation of the movable arm assembly 120 and the welding power supply device is convenient, and configuration is reasonable, and thus it is possible to reduce the volume of the entire structure.

To realize quick assembly of the welding tong and the welding power supply device, the at least one connection block 130 for connecting with the welding power supply device is provided and at least one connection hole for connecting with the welding power supply device is provided on the at least one connection block 130, and to ease connection, the at least one connection block 130 is configured to be U-shaped, and an orientation of the U-shaped groove of the U-shaped structure is parallel to the longitudinal direction of the drive rod 141, therefore, the welding power supply device is provided above the drive assembly 140 by plugging the first electrode of the welding power supply device into the U-shaped groove and fixing with screws, and when it is necessary to detach them, loosening the screws the welding power supply device can be detached and rapid connection of the welding power supply device of the welding tong is realized.

In the present invention, a flange structure 142 provided in between a pair of lateral connection plates 510 is connected at the drive rod 141 of the drive assembly 140, the pair of lateral connection plates 510 can be connected on the flange structure 142 rotatably, so that space for movement of the movable arm is provided.

As shown in FIGS. 3 and 4, in the present embodiment, the static arm 150 is connected with the second electrode via a second conductivity bridge 501, a plurality of connection holes are provided at an end of the static arm close to the welding power supply device, the plurality of connection holes are configured to be connected with the lateral connection plates 510, the lateral connection plates 510 are provided at both sides of the static arm 150 and the movable arm assembly 120, and are parallel to each other, in the present embodiment, for the sake of convenience only one lateral connection plate 510 is shown in the drawings, and another lateral connection plate parallel thereto is not shown. In the present embodiment, the lateral connection plates 510 are fixedly connected with the at least one connection block 130 and slidably connected with the movable arm 121, the static arm 150 and the at least one connection block 130 are located in between the lateral connection plates 510, and insulation layers are provided in between the lateral connection plates 510, the movable arm 121, the static arm 150 and the at least one connection block 130. In the present embodiment, the lateral connection plates connect the movable arm assembly, the at least one connection block, the drive assembly and the static arm to be a bearing connection mechanism of the welding tong, by integral installation of the welding power supply with the at least one connection hole in the at least one connection block, replacement of the welding tong or the power supply device is facilitated, simple connection of the welding tong and the welding power supply device is realized, the movable arm assembly and the static arm assembly are designed to be of tight structures and small-sized design can be realized.

Figure 5:
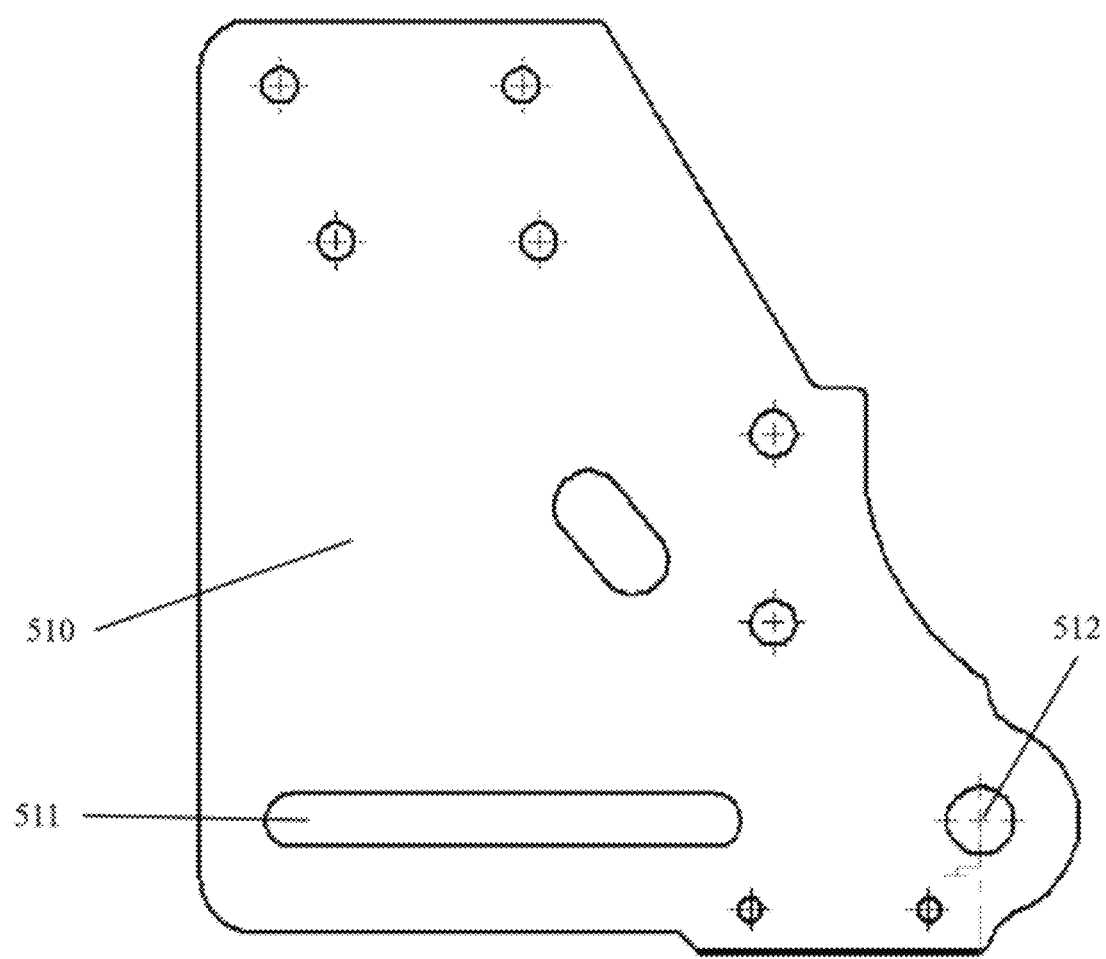
FIG. 5 is a structural diagram showing a lateral connection plate of the low-voltage high-current light-weight spot welding machine proposed in the present invention.

As shown in FIGS. 3-5, in the present embodiment, projections 221 are provided on opposing sides of the movable arm 121, slots 411 are provided on the lateral connection plates 510, the projections 221 are located in the slots 511, during working the movable arm 121 can be guided. In the present embodiment, the lateral connection plates 510 are configured to be structures similar to right-angled triangles, either ends of hypotenuses of the lateral connection plates 510 are connected with the static arm 150, another ends of the hypotenuses thereof are connected with the flange structure 142, the ends of the hypotenuses of the lateral connection plates 510 that are connected with the flange structure 142 are provided to be semi-circular, through-holes 512 are provided on the semi-circular portions, the flange structure 142 comprises a flange 421 and rotation shafts 422 connected at both sides of the flange 421, semi-circular grooves are machined on both sides of the flange 421, the lateral connection plates are connected to the rotation shafts via the through-holes, and the ends of the hypotenuses that are provided to be semi-circular are installed on the semi-circular grooves, in this way, the welding tong in the present invention has tight structures, and can realize tight connection with the welding power supply device and small-sized design has been realized.

The welding tong structure is applicable to both C-shaped welding tongs and X-shaped welding tongs, and is not limited hereto, hereinafter embodiments of the C-shaped welding tongs and the X-shaped welding tongs are provided.

In the first embodiment, as shown in FIGS. 3 and 4, in the C-shaped welding tong, the static arm 150 is C-shaped, the lateral connection plates 510 are respectively connected at both sides of an end of the C-shaped static arm 150, the movable arm 121 is configured to be underneath the static arm 150 and in between the lateral connection plates 510, the movable arm 121 is connected with a drive rod 141 on the drive assembly 140 via the nut flange 122, semi-circular grooves are machined at both sides of the flange 421, the lateral connection plates 150 are connected to the corresponding rotation shafts 422 via the through-holes 412, and the ends of the hypotenuses that are provided to be semi-circular are installed in the semi-circular grooves; the drive assembly 140 drives the drive rod 141 to drive the nut flange 122 so as to drive the movable arm to make reciprocal movements and welding pressure is generated in between the electrode cap on the electrode rod of the static arm and the electrode cap of the electrode rod of the movable arm; the flange 421 in the flange structure 142 is connected at either ends of the hypotenuses of the lateral connection plates 510, the at least one connection block 130 is provided at intermediate portions of the hypotenuses of the lateral connection plates 510, and the at least one connection block 130 faces outwards and is parallel to a stretching direction of the drive rod 141. The first electrode of the welding power supply device is inserted into the U-shaped groove of the at least one connection block 130, the first electrode is connected with the movable arm via the first conductivity bridge 1201, the second electrode 112 is connected with the static arm via the second conductivity bridge 501, by connecting the lateral connection plates 510, the at least one connection block 130 and the welding power supply device 111 with the screw in the at least one connection hole, the welding power supply device is made to integral with the welding tong and rapid detachment of the welding tong and the welding power supply device is realized.

Figure 6:
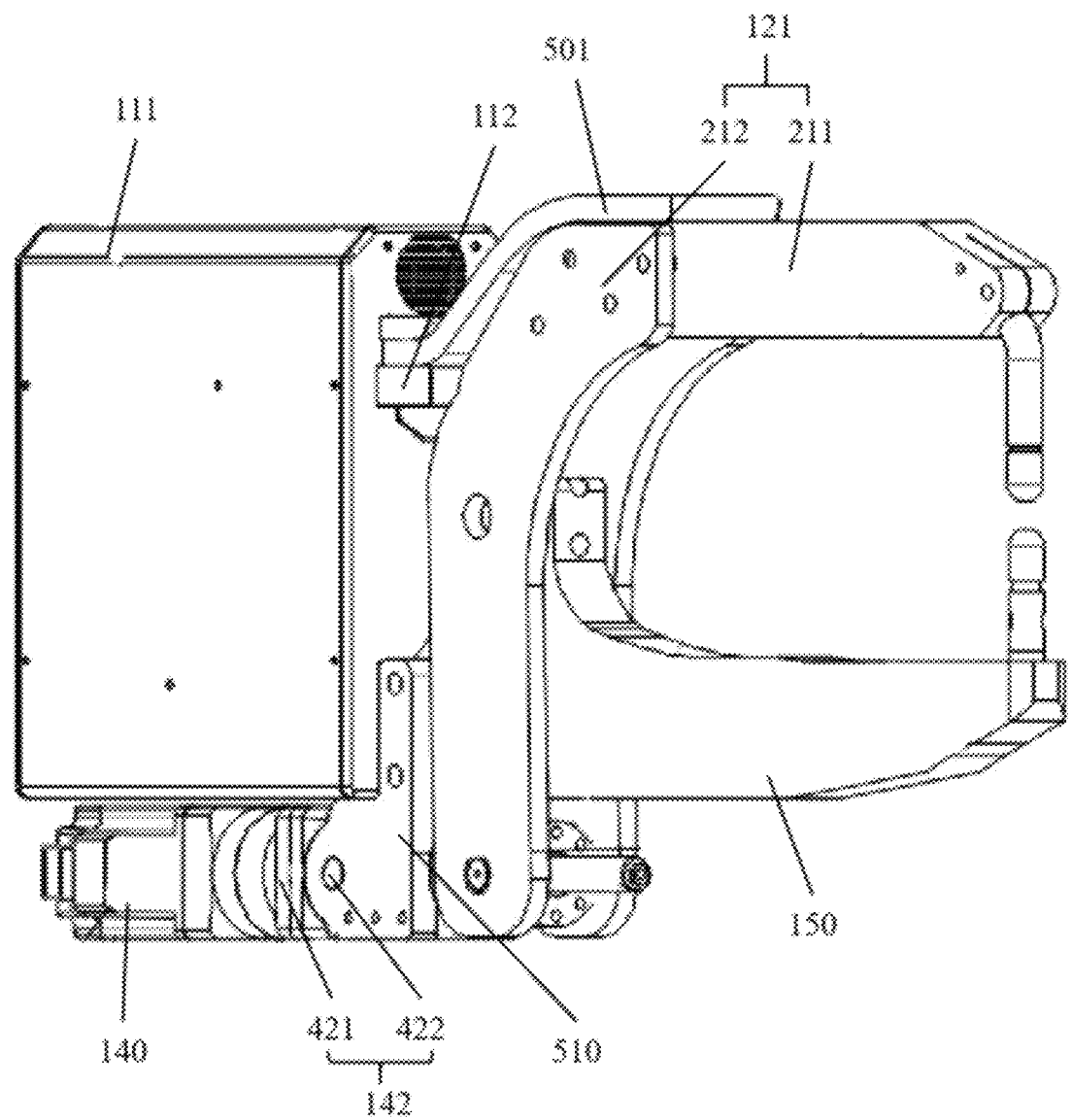
FIG. 6 is another structural diagram showing the low-voltage high-current light-weight spot welding machine proposed in the present invention.
Figure 7:
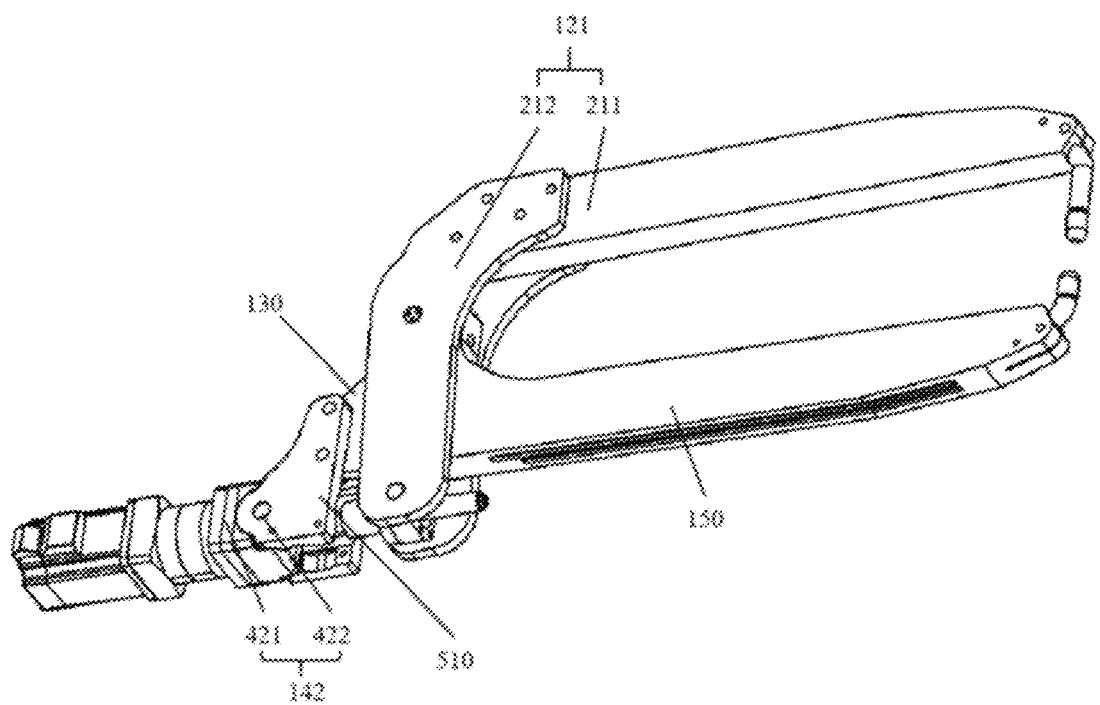
FIG. 7 is a structural diagram showing an X-shaped welding tong of the low-voltage high-current light-weight spot welding machine proposed in the present invention.
Figure 8:
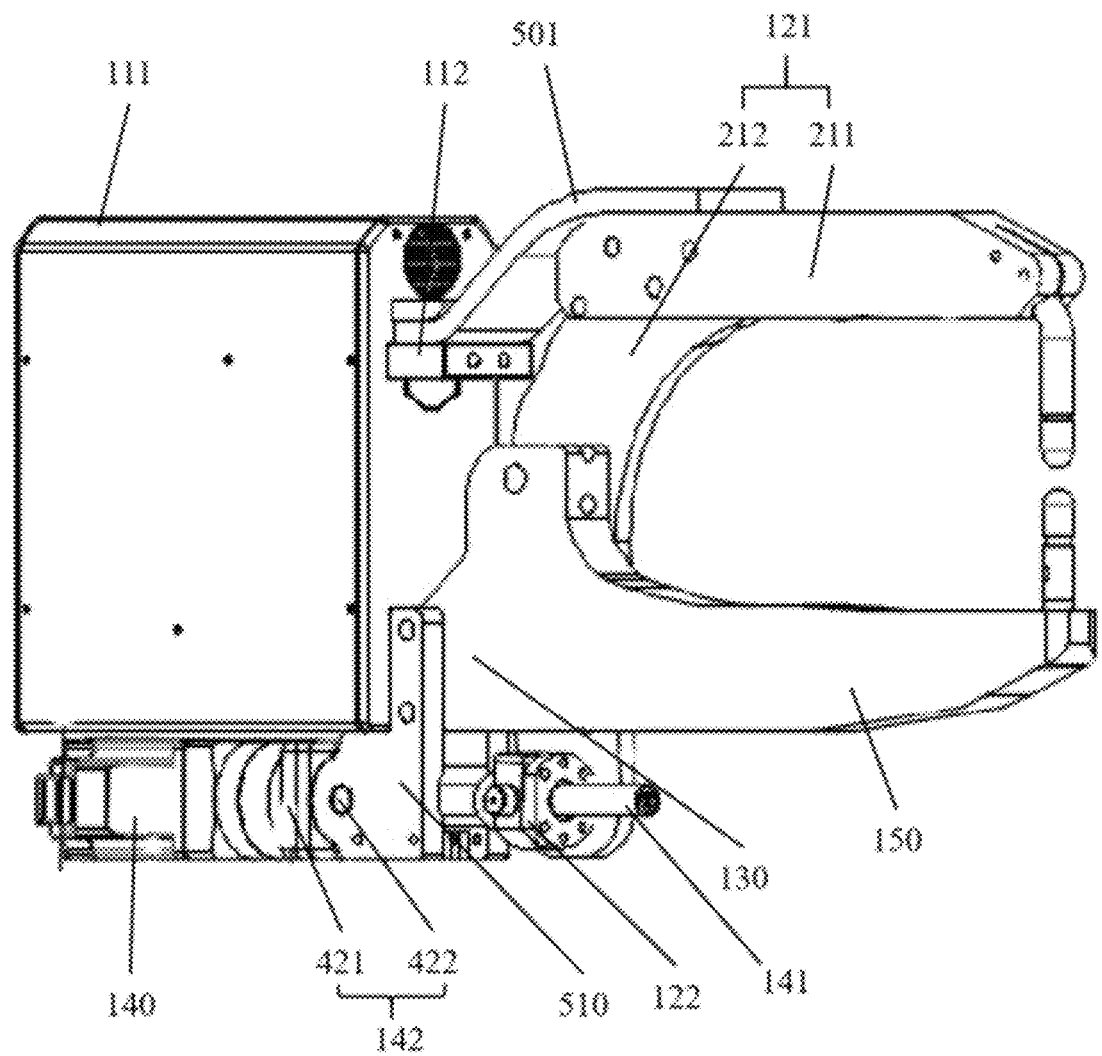
FIG. 8 is a structural diagram showing the low-voltage high-current light-weight spot welding machine in another perspective as proposed in the present invention.

As shown in FIGS. 6-8, in the second embodiment, in the X-shaped welding tong, the movable arm 121 comprises a transverse rod portion 211 parallel to the static arm 150 and a pair of rotation plates 212 connected with both sides of the transverse rod portion 211 by at least one shaft, and in the present embodiment, the rotation plates 212 can also be configured to be integral with the movable arm. Protruding rotation shafts connected with the pair of rotation shafts 212 are provided at both sides of the nut flange 122, the nut flange 122 is connected with the drive rod 141 provided on the drive assembly 140, the lateral connection plates 510 are connected at an end of the static arm 150 and is close to the pair of rotation shafts 211, the static arm 150 can be provided to be L-shaped, through-holes are provided at intermediate portions of the rotation plates 212 and through-holes are provided in the static arm 150, the through-holes are connected via self-locking rotation shafts, the at least one connection block 1340 is provided at an end of the static arm 150 close to the lateral connection plates 510, the at least one connection block 130 is integrally formed with the end of the static arm 150, the U-shaped groove faces outwards, the drive rod 141 is parallel to the static arm 150, semi-circular grooves are machined at both sides of the flange 421, the lateral connection plates 510 are connected with the rotation shafts 422 via the through-holes, ends of the hypotenuses that are configured to be semi-circular are installed in the semi-circular grooves, the lateral connection plates 510 are rotatably connected with the flange 521 provided in between the lateral connection plates 510, in this way, space for movement of the drive assembly when the movable arm is moving can be provided; the drive assembly 140 drives the drive rod 141 to drive the nut flange 122 to to have the movable arm on the lateral connection plates 212 conduct reciprocal movements, and welding pressure is generated in between the electrode cap on the electrode rod of the static arm and the electrode cap of the electrode rod of the movable arm, the structural design is simple and installation and maintenance is convenient.

As shown in FIGS. 7-8, the at least one connection block 130 is integrally formed with an end of the static arm 150, the first electrode of the welding power supply device is plugged into the U-shaped groove of the at least one connection block, the first electrode can be electrically connected with the static arm, it is no longer necessary to provide the first conductivity bridge, the second electrode 112 is connected with the movable arm 121 via the second conductivity bridge 501, with screws the lateral connection plates 510, the at least one connection block 130 and the welding power supply device can be connected together via the corresponding connection holes provided in the first electrode, the welding power supply device and the welding tong are made integral and quick detachment of the welding power supply device and the welding tong can be convenient. In the present embodiment, the conductivity bridges are made by laying up a plurality of copper strips, and are flexible and can make corresponding changes according to the movements of the movable arm and the static arm, and the fixed connection area of the conductivity bridges can meet requirements on output power of the welding power supply device.

In the embodiments of the present invention, the static arm and the lateral connection plates can be configured to be integral, and the movable arm and the rotation plates can be configured to be integral, and the structural designs will not be elaborated here. The present invention provides a low-voltage high-current light-weight spot welding machine, by connecting tightly the movable arm assembly, the drive assembly and the static arm with the lateral connection plates provided at both sides of the static arm, a bearing connection mechanism of the welding tong is formed; by connection positions of the at least one connection block in the bearing connection mechanism of the welding tong, rapid connection with the welding power supply device can be realized, modular assembly of the welding tong, the welding power supply device and the drive assembly can be realized and small-sized design of the welding tong is made possible;

In the present invention, by the structural design of the lateral connection plates, utilizing the stability principle of a structure similar to triangles, the static arm is connected with the flange structure in the drive assembly, and operation space for working of the movable arm is provided by rotation design between the lateral connection plates and the flange structure;

In the present invention, by the configuration of the at least one connection block and the lateral connection plates, the provision of the at least one connection block at an end of the static arm far away from the electrode rods in both X-shaped welding tongs and C-shaped welding tongs, and configuring the at least one connection block to be U-shaped connection block, providing the U-shaped groove to be parallel to a longitudinal direction of the drive rod, and by providing the welding power supply device to be parallel to the drive assembly, the entire welding tong is of tight structures and small-sized;

the present invention provides a low-voltage high-current light-weight spot welding machine, wherein by winding the copper strips in different layers tightly, providing symmetrically the plurality of central leading out terminals and the plurality of secondary leading out terminals, providing the heat dissipation unit at the top portion and the bottom portion of the transformer body, winding cooling water pipes around the transformer line pack and cooling of the inverter assembly and the rectifier assembly via the heat dissipation unit, the transformer can work at the current of tens of thousands of amperes for a long term and as the leakage inductance is very small, active power is big, voltage stress is greatly reduced, components of smaller volumes can be used for the rectifiers and the inverters, requirements on cooling are reduced and very tight and integral power supply design is made possible. Also as the leakage inductance of the transformer is very small, duty-ratio-loss is reduced and the low-voltage high-current power supply device can maintain high efficiency output at the working frequency of 20 KHz. The structural design of the welding machine is tight, configuration thereof is reasonable, space is fully utilized, so that the welding power supply device is of a tiny volume, and small-sized design of the welding power supply device is realized. In the meanwhile, the same welding power supply device can be used for both the X-shaped welding tongs and the C-shaped welding tongs, by providing the lateral connection plates, and connecting of the movable arm assembly, the at least one connection block, the drive assembly and the static arm with screw and connecting with the welding power supply device, the bearing connection mechanism and the welding power supply device can be detached to be two individual units, small-sized design of the welding tong is done, detachment is easy, quick change of the two welding tongs is realized and great convenience is brought to production and maintenance work.

The foregoing are merely some preferred embodiments of the present invention and an explanation of the technical principles behind the embodiments, those skilled in the art shall understand that, the scope of the present invention is not limited to the technical solutions obtained by specific combinations of the technical features, and shall cover in the meantime other technical solutions obtained by random combinations of the foregoing technical features or equivalent features, for example, the technical solutions formed by replacing the technical features with other technical features disclosed in (not limited to) the present invention with similar functions.

Except the technical features disclosed in the present invention, all other technical features are known to those skilled in the art and to show the inventiveness of the present invention, the other technical features have not been repeated herein.

The invention claimed is:

1. A low-voltage high-current light-weight spot welding machine, comprising:

a welding power supply device, wherein the welding power supply device comprises a casing, a first electrode and a second electrode, wherein portions of the first electrode and the second electrode extend out of the casing, and the portions of the first electrode and the second electrode extending out of the casing are located at the same side of the casing;

a movable arm assembly, comprising a movable arm and at least one nut flange, wherein an end of the movable arm is connected with the at least one nut flange, the movable arm assembly is connected with the first electrode via a first conductivity bridge;

at least one connection block, provided in between the first conductivity bridge and the first electrode, and connected with the first electrode;

a drive assembly, wherein a drive rod of the drive assembly is connected with the at least one nut flange, the drive rod is configured to drive the movable arm and is located at a bottom portion of the casing, and at least one flange structure is provided on the drive rod;

a static arm, wherein the static arm is connected with the second electrode via a second conductivity bridge, the static arm is connected with the movable arm via lateral connection plates, the lateral connection plates are connected with the static arm and the at least one connection block via a plurality of bolts, and the lateral connection plates are rotatably connected at the at least one flange structure;

wherein, by connecting the movable arm assembly, the at least one connection block, the drive assembly and the static arm with the lateral connection plates, a bearing connection mechanism of a welding tong of a spot welding machine is formed and the bearing connection mechanism is integrally connected with the welding power supply device.

2. The low-voltage high-current light-weight spot welding machine according to claim 1, wherein, a plurality of connection holes are provided on the portions of the first electrode and the second electrode extending out of the casing, and the first electrode is vertically provided and the second electrode is horizontally provided.

3. The low-voltage high-current light-weight spot welding machine according to claim 1, wherein, the lateral connection plates are provided in parallel at both sides of the movable arm and the static arm.

4. The low-voltage high-current light-weight spot welding machine according to claim 1, wherein, slots are provided on the lateral connection plates.

5. The low-voltage high-current light-weight spot welding machine according to claim 4, wherein, projections are provided on opposing sides of the at least one nut flange, and the projections are located in the slots.

6. The low-voltage high-current light-weight spot welding machine according to claim 1, wherein, the lateral connection plates are configured to be similar to a right-angled triangle, and either ends of hypotenuses of the lateral connection plates are connected with the static arm and another ends thereof are connected with the at least one flange structure.

7. The low-voltage high-current light-weight spot welding machine according to claim 6, wherein, the ends of the hypotenuses of the lateral connection plates connected with the at least one flange structure are configured to be semi-circular, and through-holes are provided in the semi-circular portions.

8. The low-voltage high-current light-weight spot welding machine according to claim 7, wherein, the flange structure comprises a flange and rotation shafts connected at both sides of the flange, and semi-circular grooves are provided at both sides of the flange.

9. The low-voltage high-current light-weight spot welding machine according to claim 8, wherein, the lateral connection plates are connected on the rotation shafts via the through-holes, and the ends of the hypotenuses configured to be semi-circular are installed in the semi-circular grooves.

10. The low-voltage high-current light-weight spot welding machine according to claim 1, wherein, the at least one connection block is configured to be a U-shaped connection block, and the U-shaped connection block is connected with the first electrode.

* * * * *